United States Patent [19]

Reiter

[11] 4,053,045
[45] Oct. 11, 1977

[54] RESILIENTLY MOUNTED CONVEYOR BELT CLEANER

[75] Inventor: Robert C. Reiter, Aurora, Ill.

[73] Assignee: Material Control, Inc., Aurora, Ill.

[21] Appl. No.: 769,493

[22] Filed: Feb. 17, 1977

Related U.S. Application Data

[63] Continuation of Ser. No. 651,462, Jan. 22, 1976, abandoned.

[51] Int. Cl.² .................................................. B65G 45/00
[52] U.S. Cl. ................................. 198/499; 15/256.6; 74/230; 248/15; 248/358 R
[58] Field of Search ................ 198/497, 499, 635, 637; 15/256.5, 256.51, 256.6; 74/230; 248/15, 358 R

[56] References Cited

U.S. PATENT DOCUMENTS

| 3,430,901 | 3/1969 | Cauvin | 248/15 |
| 3,656,610 | 4/1972 | McWilliams | 198/499 |

*Primary Examiner*—Evon C. Blunk
*Assistant Examiner*—Joseph E. Valenza
*Attorney, Agent, or Firm*—Cullen, Settle, Sloman & Cantor

[57] ABSTRACT

A resiliently mounted conveyor belt cleaner is provided to serve as a mechanical cleaner for an endless conveyor belt. The cleaner includes a plurality of independently operable scraper blade assemblies for removing objectionable foreign materials from the surface of the conveyor belt. Each of the blade assemblies is resiliently mounted on a support which is fixedly positionable transversely of and adjacent to the surface of the belt. Each blade assembly includes an elongated arm having a blade mounted at one end and a resilient support-engaging assembly at its opposite end, each support-engaging assembly being individual to its arm. In a first embodiment, a block of resilient material is used to bias each arm and absorb shock. Each of the arms has a generally rectangular flat portion at its support-engaging end and the flat portion is placed into contact with the length of one face of the block before being secured to the support so as to evenly distribute the load experienced by the arm over a large surface area of the resilient block. In a second embodiment, the resilient block and the support-engaging end of the arm are free of apertures to provide greater strength and durability. The block and the support-engaging end of the arm are compressibly retained relative to each other and the support by a clamping element attachable to the support. In yet another embodiment, a relatively flat arm is resiliently secured to the support by a compression spring assembly which biases the arm, absorbs shock, and distributes the load via a relatively large spring contacting area of the flat arm.

5 Claims, 16 Drawing Figures

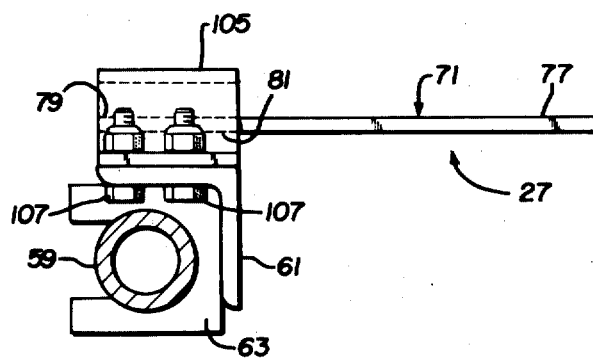
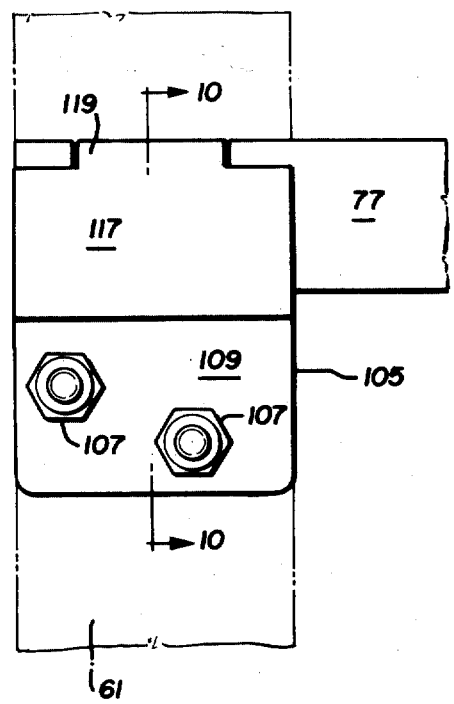
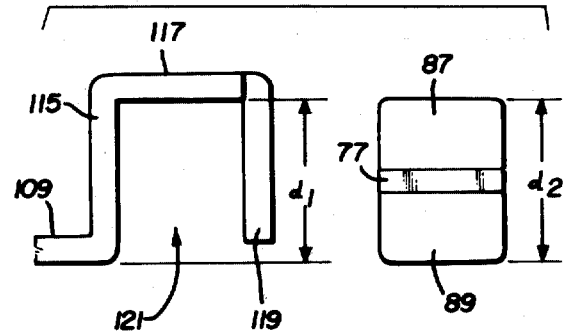
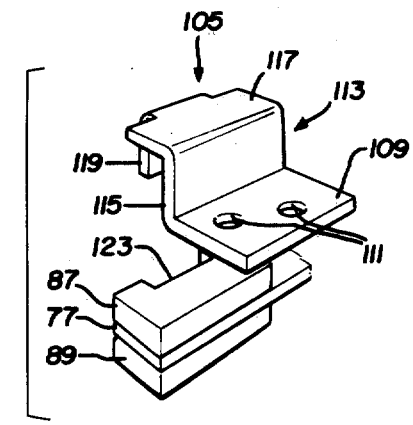

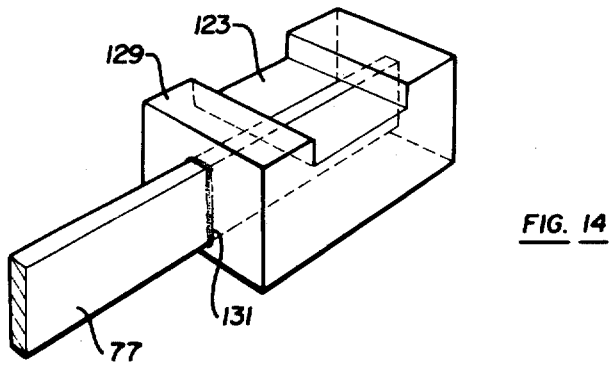
FIG. 14
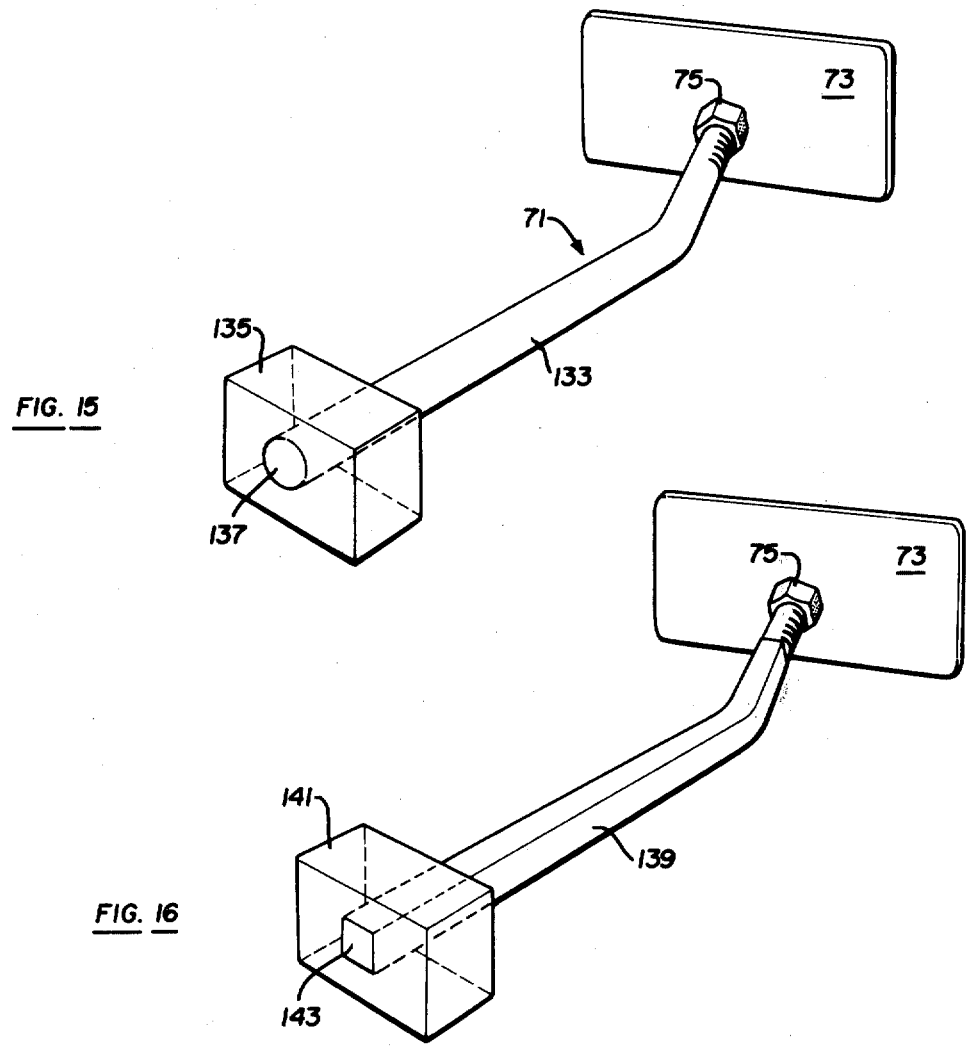
FIG. 15
FIG. 16

RESILIENTLY MOUNTED CONVEYOR BELT CLEANER

This is a continuation of Application Ser. No. 651,462, filed Jan. 22, 1976, now abandoned.

BACKGROUND OF THE INVENTION

1. Field of the Invention

The invention relates generally to a conveyor belt cleaner and more particularly to a resiliently biased shock-absorbing belt cleaner for scraping objectionable foreign materials from the surface of power driven conveyor belts.

2. Description of the Prior Art

The prior art discloses many types of mechanical cleaning assemblies mounted beneath the return run or strand of a conveyor belt for scraping or wiping objectionable foreign materials which had adhered to the belt. Early belt cleaners employed leaf springs to resiliently bias the wiper or scraper blades toward the conveyor belt and the blades were normally arranged in echelon fashion, in a single row, to provide an overlapping effect. Later patents teach arranging a plurality of scraper blades in staggered rows in an overlapping fashion so as to achieve improved cleaning efficiency without interference between adjacent blades.

U.S. Pat. No. 3,342,312, teaches a conveyor belt cleaner which employs a plurality of independently operable scraper blades which are biased toward the return run of the belt by a plurality of torsion arm spring members. Later patents teach other forms of individually operable scraper blade arms biased to swing about a pivot point and urge the scraper blade into scraping contact with the conveyor belt by means of various types of spring members.

U.S. Pat. No. 3,656,610, which is assigned to the Assignee of the present invention, teaches a plurality of independently operable torsion spring wiper blade assemblies mounted on a support structure by means of a resilient mounting assembly which absorbes vibration and shock to minimize fatigue and breakage of the spring arms. The spring arms of this patent are torsion springs having elongated slender portions with a circular cross-section. They are made from a single piece of spring steel and the rear end is bent back upon itself to form an elongated eyelet. The patent teaches that a resilient block of elastomeric material can be secured to the arm by passing a threaded bolt through a hole in the resilient block and through the eyelet for securing the assembly to the support.

Other prior are patents teach conveyor belt cleaner assemblies wherein individually operable scraper blade arms are biased to swing about a pivot axis and urge the wiper blades into contact with a conveyor belt by means of individual elastomeric spring members associated with each of the arms. Furthermore, the prior art teaches that a plurality of wiper blade assemblies which are not individually operable may be provided with relatively flat portions at the support-engaging end thereof and rigidly bolted to the support through the flat portion.

While the pior art has shown the use of a resilient block of elastomeric material used to mount the support-engaging end of a slender elongated torsion arm having a circular cross-section, it has been found that the generally circular nature of the arm tends to push down through and eventually destroy the effectiveness of the elastomeric block due to the uneven distribution of the load experienced by the arm.

It has also been found that the use of apertures or eyelets in the support-engaging end of the arms structurally weakens the arm and often leads to breakage at the point of the apertures. Furthermore, the use of an apertured arm and a block of elastomeric material having apertures therethrough so that the block may be connected to the arm through the apertures also tends to structurally weaken the elastomeric block and cause premature deterioration of the elastomeric material.

Furthermore, while compression springs have been employed in the prior art to bias the arm so as to urge the scraper blades towards the conveyor belt, the arms have not been shaped so as to more evenly distribute the load experienced by the arm over the spring assembly so as to prolong the life of the scraper blade assemblies.

The elongated arms used in the scraper blade assemblies of the prior art are normally leaf springs or torsion arms and they are seldom formed from rod-like spring material or from any type of non-spring-type material which could greatly increase their resistance to breakage. The United States patents listed below are cited herein as being typical of the prior art generally found in this field: U.S. Pat. Nos., 2,393,724; 2,794,540; 3,315,794; 3,342,312; 3,504,786; 3,598,231; 3,656,610 and 3,674,131.

The present invention provides an improved means for absorbing shock and for biasing the scraper blades toward the conveyor blade while more evenly distributing the load experienced by the arm over the biasing means so as to prolong the life of the arm and the life of the biasing means.

SUMMARY OF THE INVENTION

The conveyor belt cleaner of the present invention is particularly adapted to efficiently scrape foreign materials from the surface of conveyor belts. Each individually operable scraper or wiper arm is biased to urge the blade into scraping contact with the surface of the belt. The cooperation between the biasing means and the shape of the elongated wiper arm provides for improved shock-absorbing and biasing characteristics while insuring a more even distribution of the load experienced by the arm over the biasing means so as to prolong the life of the biasing means and prevent arm breakage.

In a first embodiment of the conveyor belt cleaner of the present invention, the elongated arm is provided with a substantially rectangular relatively flat portion at its support-engaging end. A generally rectangular block of elastomeric material is placed into contact with either the top surface of the relatively flat portion, the bottom surface of the relatively flat portion, or with both the top and the bottom surfaces to sandwich the relatively flat portion therebetween. The combination of the elastomeric block and the flat portion of the arm are secured to the support such that the elastomeric block of resilient material will urge the wiper blade toward the conveyor belt after it has been moved away therefrom while simultaneously serving as a shock-absorbing device. The generally rectangular shap of the block corresponds generally to the rectangular shap of the flat portion of the arm so that the load experienced by the arm is distributed relatively evenly over the surface of the elastomeric block which contacts the flat portion of the arm thereby prolonging the life of the elastomeric block and preventing breakage of the arm.

In the preferred embodiment of the conveyor belt cleaner of the present invention, the resilient block of elastomeric material and the support-engaging end of the arm are free of apertures to provide greater strength and durability. The elastomeric block may be placed above, below, or both above and below the support-engaging end of the arm and the assembly is attached to the support by means of a clamp member. The block and the support-engaging end of the arm are compressibly retained relative to each other and the support within the clamping element and optimum distribution of the load experienced by the arm is obtained. Since there are no apertures through the arm or through the block, deterioration is minimized and the life of the block and the arm are greatly prolonged.

Another embodiment of the conveyor belt cleaner of the present invention employs an elongated arm having a substantially flat portion adjacent its support-engaging end. A compression spring assembly is provided with compression springs above and below the arm so as to secure the arm to the support in such a matter as to bias the arm to urge the blade generally toward the conveyor belt while absorbing the shock and distributing the load by the spring contacting relatively large areas of the relatively flat arm.

Generally, the use of the flat arm in any of the embodiments of the present invention spreads the load more evenly over the biasing means to preserve the life of the biasing means, prevent arm breakage, and provide better shock-absorbing characteristics. The use of the clamp in the prime embodiment of the present invention eliminates the holes in the elastomeric block and in the elongated arm. Since these holes often tended to cause premature deterioration in both the elastomeric block and in the arm, the life of both the block and the arm have been greatly prolonged. Additionally, the clamp tends to optimize the even distribution of the load over the elastomeric block for each individual spring assembly as it is tightened to the support. By making the inside dimension of the clamp less than the height of the elastomeric block and the support-engaging end of the elongated arm combined, each assembly will be under a predetermined and uniform pressure when tightened to the support.

Additionally, the prime embodiment of the present invention does not specifically require a relatively flat portion at the support engaging end of the arm and, in fact, does not even require that the elongated arm be a leaf spring. Since we are using an elastomeric block at the support end of the elongated arm, it need not be made of spring material at all and it could be a square rod, a round rod, or any other odd shaped spring or non-spring-type material.

Even further, it will be recognized that the elastomeric material need not be shaped in a form of a block but could be shaped to conform to the interior of the clamp member to provide a uniform distribution of the load. Additionally, the elastomeric material could be a unitary piece molded or other wise adhered to the elongated arm or it could be made from separate parts as discussed herein.

These and other advantages a meritorious features of the present invention will be more fully understood from the following discription of the drawings and the preferred embodiment, the appended claims and the drawings which are briefly described hereinbelow.

BRIEF DESCRIPTION OF THE DRAWINGS

FIG. 6 is a side elevation of the prime embodiment of the scraper blade assembly of the present invention as secured to the support of FIG. 1 via a clamping member;

FIG. 7 is a top view of the clamping member of the prime embodiment of the present invention;

FIG. 8 is a prespective view, partially exploded, to show the clamping member of the preferred embodiment about to receivably engage an elastomeric block of resilient material and the support-engaging end of the arm;

FIG. 9 is a side view of a portion of the clamping member of FIG. 7, partially broken away, and a pair blocks of elastomeric material with the support-engaging end of the arm sandwiched therebetween to show the dimensional differences therebetween;

FIG. 14 is a perspective view of an elastomeric block molded or otherwise adhered to the support-engaging end of elongated arm;

FIG. 15 shows a perspective view of an alternate embodiment wherein the elongated arm is a round rod-like member; and FIG. 16 is a perspective view of another embodiment wherein the elongated arm is a generally rectangular rod-like member and the phantom lines indicate that a block of resilient material may be fixedly adhered to the support-engaging end thereof.

DESCRIPTION OF THE PREFERRED EMBODIMENT

Figure 1:
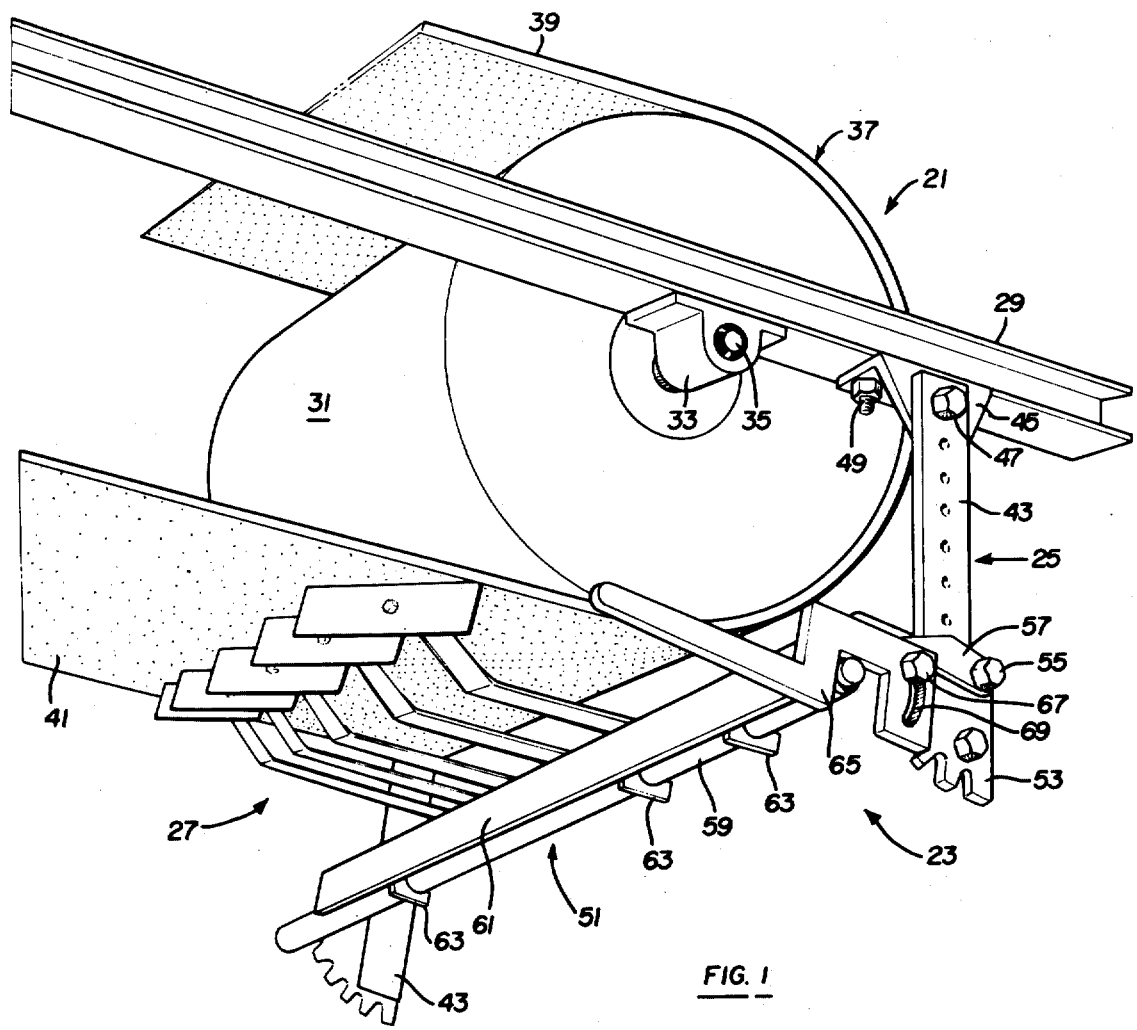
FIG. 1 is a fragmentary perspective view of the conveyor and mechanical belt cleaner therefore, with the cleaner mounted below the return strand of the conveyor belt and in an operative position.

FIG. 1 shows a conveyor belt assembly 21 having mounted thereon a mechanical belt cleaner assembly 23 which includes a hanger assembly 25 and a plurality of scraper blade assemblies 27. The conveyor belt assembly 21 includes a frame 29 which supports a pair of pulleys, rollers or drums; only the head roller or drum being shown in FIG. 1 and designated by the reference character 31. The drum 31 is mounted on a shaft 33 which is supported by lugs or bearings 35 carried by the frame 29. An endless belt 37 is entrained about the drum 31 so as to define an upper strand or delivery run 39 and a lower strand or return run 41. Such belts have been found useful in transporting various materials and it has been found that many of the materials transported tend to adhere or stick to the belt. The life of the belt may be extended by removing abrasives or other objectionable foreign materials from the surface of the belt 37 and the mechanical belt cleaner assembly 23 of the present invention operates to wipe or scrape the objectionable foreign materials from the surface of the belt 37 and thus prolong its life.

The mechanical belt cleaner assembly 23 is suspended beneath the return strand 41 of the conveyor belt assembly 21 of FIG. 1 via a hanger assembly 25. The hanger assembly 25 includes a pair of hanger bars 43 each of which has its upper end connected to a hanger clip 45 by means of some of fastening means such as the bolt and nut combination represented by reference numeral 47. The hanger clip 45 is securely attached to the frame 29 by some type of fastening means, such as by the bolt and nut combination illustrated by reference character 49, as known in the art. The hanger bars 43 are located at opposite sides of the frame 29 and hence of the conveyor belt 37. The hanger bars 43 depend generally vertically downward from the frame 29, as illustrated in FIG. 1, and their lower ends are adapted for receiving a support assembly or support 51. The lower end of each of the hanger bars 43 is provided with an adjustable locking plate 53 which is selectively secured at any one of a plurality of vertical positions along the hanger bar 43 by fastening devices 55. A support shaft-supporting arm 57 is secured to the outer surface of each of the adjustable locking plates 53 by means of the aforesaid fastening devices 55. The shaft or rod-supporting arms 57 carry and support the opposite ends of an elongated support shaft, rod, pipe or tube 59 to form a generally U-shaped support beneath the conveyor assembly 21.

The support assembly 51 also includes an L-shaped elongated support member or holder 61. The holder 61 is mounted to rotate and to slide on the supporting shaft 59 by a plurality of C-clips 63 fixed on one end to the holder 61. The support assembly 51 further includes an adjusting lever or pressure handle 65 which is fixed on one end to the holder 61, and fastening means including a stud 67 on one end of the shaft-supporting arms 57 to secure the support assembly 51 and the scraper blade assemblies 27 which are affixed thereto into position. The stud 67 extends through an arcuate slot or opening 69 formed in the pressure handle 65. The support assembly 51, including the support shaft 59 and the holder 61 attached thereto is provided with a plurality of resiliently-mounted scraper blade assemblies 27 which will be described in more detail with respect to FIGS. 4 through 6.

Figure 2:
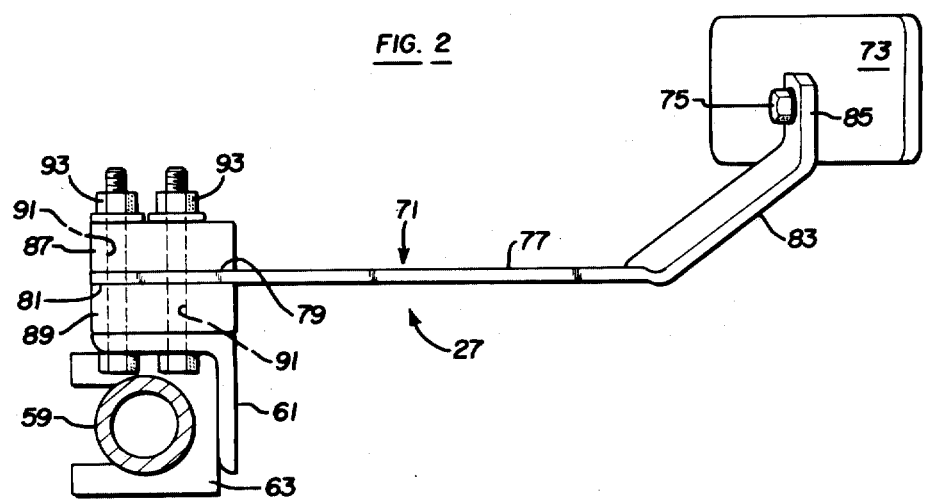
FIG. 2 is a side elevation of one embodiment of the scraper blade assembly of the present invention secured to the support of FIG. 1 with elastomeric blocks both above and below the support-engaging end of the arm.

FIG. 2 shows one embodiment of a scraper blade assembly 27 of the present invention. The scraper blade assembly 27 includes a generally rectangular elongated arm 71 having a scraper or wiper blade 73 secured to one end thereof by means of a fastening device 75, as known in the art. The elongated arm 71 includes a generally rectangular substantially flat portion 77 adjacent the support-engaging end of the arm 71. The substantially flat portion 77 has a pair of substantially planar, parallel upper and lower surfaces 79 and 81, respectively, adjacent the support-engaging end of the elongated arm 71. The arm 71 further includes a central portion 83 which is inclined from the plane defined by the parallel upper and lower planar surfaces 79 and 81 and is bent such that a plane defined by the central portion is substantially normal to the plane defined by the surfaces 79, 81. The arm 71 further includes a blade-engaging end portion 85 which is bent to define still another plane which forms an acute angle with respect to the length of the strand 41 and the scraper blade 73 is attached to the end portion 85 by means of the fastening device 75, as known in the art. For further details relating to a specific construction of one embodiment of the elongated arm 71 of the present invention, reference is made to U.S. Pat. No. 2,794,540 which is incorporated by reference herein.

In the embodiment of FIG. 2, first and second blocks 87, 89 of resilient material are provided for shock-absorbing and biasing purposes. The resilient material may be natural or synthetic rubber or any other type of resinous material and will be referred to generally as "elastomeric" within the scope of the present invention to describe any elastic rubber-like substance. The elastomeric material may be some what spongy or somewhat hard depending on the particular application to which it is put. It has been found that the resiliency is preferrably within the range is 20 to 60 durometer with a material having a 40 durometer reading being preferred for general applications.

In the present application, the first and second blocks of the elastomeric material 87, 89 are generally in the form of retangular blocks with their width corresponding approximately to the width of the flat portion 79 of the arm 71. The upper and lower surfaces of the blocks 87, 89 are substantially flat and both the blocks 87, 89 and the flat portion 77 adjacent the support-engaging end of the arm 71 are provided with apertures 91 for engagably receiving fastening devices 93, as known in the art. In FIG. 2, the lower flat surface of the first elastomeric block 87 is placed into contact with the upper planar surface 79 of the flat portion 77 while the lower planar surface 81 of the flat portion 77 of the elongated arm 71 is placed into contact with the upper planar surface of the lower block 89. The apertures 91 are aligned and the fastening means 93, which may be a bolt and nut combination or any similar means known in the art, is passed through the apertures and corresponding apertures in the holder 61 so as to secure the upper and lower elastomeric blocks 87, 89 and the flat portion 77 of the arm 71 which is sandwiched therebetween to the support assembly 51 via the holder 61 and the C-clamp members 63 secured thereto.

In the sandwich structure provided for resiliently mounting the elongated arm 71 in the illustration of FIG. 2, shock will be absorbed in either the up or the down flexing motion of the arm 71. When high wiper blade pressure is applied to or by the conveyor belt, the major portion of the shock will be absorbed by the elastomeric material of the blocks 87, 89. The elastomeric material will allow the elongated arms 71 of the freedom of "floating" with various shocks encountered along the conveyor run such as will occur with belt splices, large globules of material particles and the like. Additionally, the action of the resilient elastomeric material of the blocks 87, 89 will improve the uniformity of flexing resulting from the springlike nature of the arm 71 since the blocks 87, 89 serve to bias the arm 71 to return the scraper blade 73 toward the conveyor belt when it has been displaced therefrom. The use of the elastomeric material of blocks 87, 89 greatly improves the uniformity of the spring rate at the initial point of deflection since while the initial spring rate varies considerably in a typical coil torsion spring, the initial spring rate per inch of deflection of a elastomeric block is more uniform through out the range of deflection. Additionally, it is quite easy to modify this spring rate merely by changing the composition of the elastomeric material, that is, by selecting a softer or harder durometer material for the block. This permits the user to easily control the bias of the arm deflection to suit different cleaning applications. One advantageous result of this uniformity will be that the wiper blades 73 will wear more evenly. Another advantage is that the natural "give" of the elastomeric material of the blocks 87, 89 aids in keeping the wiper blades 73 from being held into too tight a contact with the conveyor belt 37 which would tend to cause increased blade wear without a comparable increase in cleaning action. All of these factors are in addition to the decrease in arm breakage resulting from fatique as a consequence of utilizing the resilient mounting blocks 87, 89 of the present invention.

Figure 3:
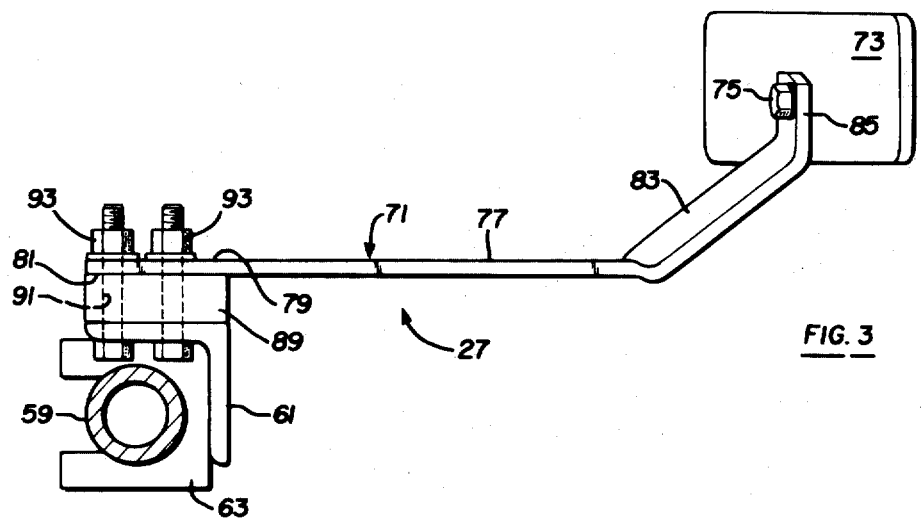
FIG. 3 is a side elevation of an alternate embodiment of the scraper blade assembly of the present invention as secured to the support of FIG. 1 with only a single block of elastomeric material between the support-engaging end of the arm and the support.

FIG. 3 provides an alternate embodiment of the scraper blade assembly of FIG. 2. In this embodiment, a single block of elastomeric material 89 is disposed with its upper flat surface engaging the lower planar surface 81 of the arm portion 77 and its lower flat surface residing directly on a flat portion of the holder 61. Fastening means 93 are inserted through the apertures 91 and the flat portion of the arm 77 and the elastomeric block 89 are secured to the support assembly 51 via the holder 61 as previously described.

Figure 4:
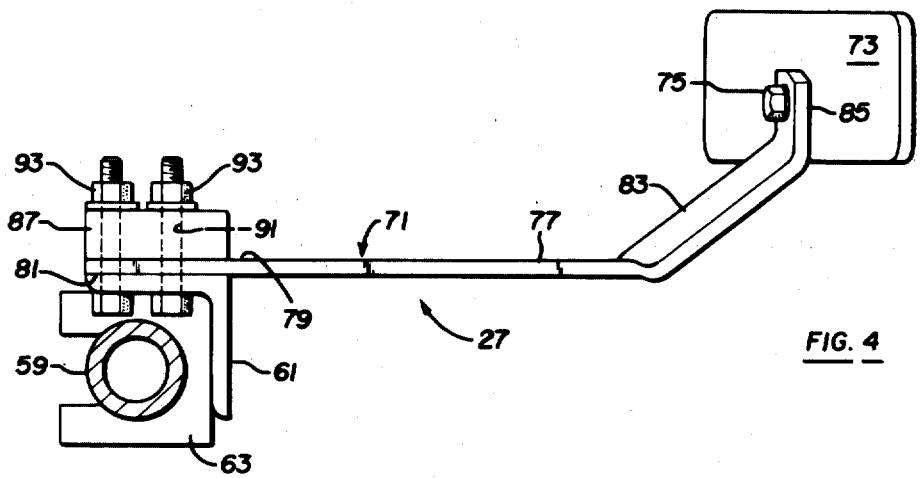
FIG. 4 is a side elevation of another embodiment of the scraper blade assembly of the present invention secured to the support of FIG. 1 via a single block of the elastomeric material mounted such that the support-engaging end of the arm is secured between the elastomeric block and the support

FIG. 4 shows still another embodiment of the scraper blade assembly 27 of FIG. 2. In this embodiment, a single elastomeric block 87 has its flat lower surface engaging the upper planar surface 79 of the flat portion 77 of the arm 71 and the lower planar surface 81 of the flat arm portion 77 resting directly on a flat portion of the holder 61. The fastening means 93 are inserted through the apertures 91 to resiliently secure the elastomeric block 87 and the flat arm portion 77 to the support assembly 51 via the holder 61 as previously described.

Figure 5:
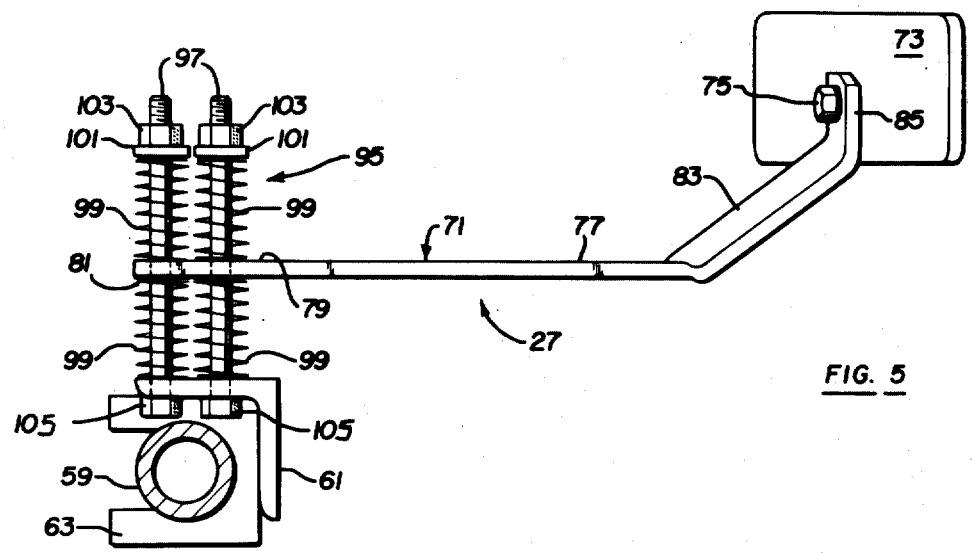
FIG. 5 is a side elevation of yet another embodiment of the present invention wherein the scraper blade assembly is mounted to the support of FIG. 1 via a compression spring assembly.

FIG. 5 shows a substantially different embodiment wherein an arm assembly similar to that of FIG. 2 and having a substantially flat portion 77 at the support-engaging end thereof is resiliently secured to the support assembly 51 via the holder 61 by a compression spring assembly 95. A pair of elongated members 97 are passed through the apertures 91 in the support-engaging end of the flat portion 77 of the arm 71 and through corrsponding apertures in the holder 61. Compression springs 99 are placed over each of the elongated member 97. Both ends of the elongated members 97 may be threaded and a pair of washers 101 having lower surfaces which bear against the base of the upper compression springs 99 may be placed over the top of the elongated members and fastening means such as nuts 103 may be threaded onto the upper end of the elongated members above the washers 101 and onto the lower end of the elongated members 97 beneath the holder 61 so as to compress the springs 99 and provide for both shock absorbsion and the biasing of the arm 71.

With the use of the resilient blocks 87 and 89 described with respect to FIGS. 2, 3, and 4, a substantial area of at least one of the surfaces of the blocks 87 and/or 89 contact a substantial surface area of the flat arm portion 77 such that a uniform distribution of the load experienced by the arm 71 occurs. Similarly, a more even distribution of the load experienced by the arm 71 can be absorbed by the compression spring assembly 95 of FIG. 5 do to the use of the substantially rectangular flat arm portions 77 in conjunction with the compression spring assembly 95.

Even though all of the advantages discussed hereinabove are achieved by the embodiments of FIGS. 2-5, the prime embodiment of FIG. 6 represents an even more significate advance. It has been found that the apertures 91 which, are formed through the flat arm portion 77 adjacent the support-engaging end of the arm 71 and through the elastomeric block 87, 89 may lead to premature deterioration of the block and the arm causing possible failure or arm breakage. The embodiment of FIG. 6 avoids these problems.

The prime embodiment of FIG. 6 employs a clamping member 105 to resiliently secure the support-engaging end of the elongated arm 71 to the support assembly 51 via the holder 61 without requiring apertures through either the arm or the resilient blocks. The clamping member 105 is secured directly to the holder 61 via fastening devices 107 as known in the art.

A top view of the clamping member 105 is shown in FIG. 7 and a perspective view of the clamping member 105 as it would compressively receive the elastomeric blocks 87, 89 and the flat arm portion 77 sandwiched therebetween within the clamping portion thereof, is shown in FIG. 8. The clamping member 105 includes a first substantially rectangular, relatively flat flange portion 109 having apertures 111 therein for receiving the fastening means 107 to attach the flange portion 109 securely to the support assembly 51 via the holder 61. The flange portion 109 defines a reference plane useful in describing the orientation of the remainder of the clamp 105. An integral L-shaped clamping portion 113 includes a side portion 115 integral with the flange portion 109 and generally extending upwardly therefrom and perpendicular to the reference plane. The cap or top portion 117 of the L-shaped portion 113 is integral with the side portion 115 and is substantially perpendicular thereto and extends in a direction opposite the direction in which the flange portion 109 extends with respect to the plane of the side portion 115. As can be seen in FIG. 8, the lengths and widths of the side portion 115 and the cap or top portion 117 are dimensionally similar to one another. A tab member 119 is integral with the cap portion 117 depends perpendicularly from the plane of the cap portion 117 and is substantially parallel to the plane of the side portion 115. The longitudinal length of the cap member 119 is dimensionally smaller than the longitudinal length of the cap portion 117. As seen in FIG. 9, the vertical length of the tab member 119 is shorter than the vertical length of the side portion 115 and the height of the clamping interior, which is illustrated by the distances "$d_1$" in FIG. 9 is deminsionally smaller than the combined height "$d_2$" of the combination of the elastomeric blocks 87, 89 and the thickness of the flat arm portion 77. This insures that when the elastomeric block-support engaging end combination is compressably received within the clamping interior 121 of the clamping member 105, it is resiliently secured therein for shock absorbsion and resilient biasing purposes.

Figure 10:
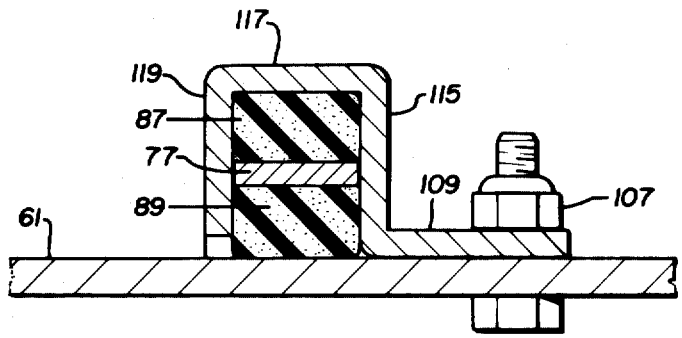
FIG. 10 is a side view showing the clamping member of the preferred embodiment secured to the support and retainably engaging the combination of the support-engaging end of the elongated arm sandwiched between a pair of elastomeric blocks.
Figure 11:
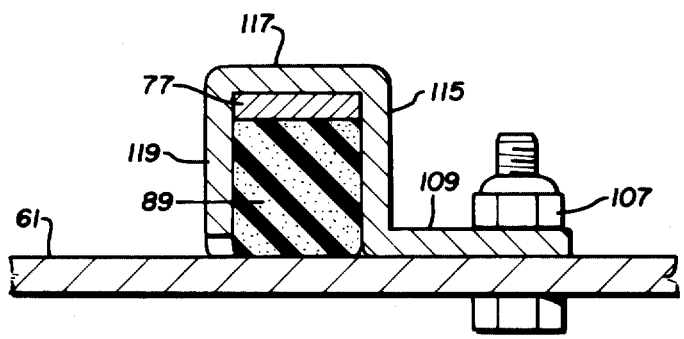
FIG. 11 is a side view of an alternate embodiment to the clamping configuration of FIG. 10 wherein a single block of elastomeric material is inserted between the support and the support-engaging end of the elongated arm.
Figure 12:
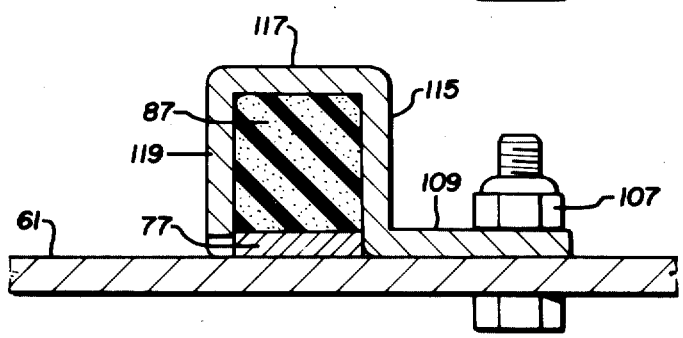
FIG. 12 is a side view of an alternate embodiment of the clamping arrangement of FIG. 10 wherein the support -engaging end of the elongated arm is engagably retained between a single block of elastomeric material and the support via the clamp.

FIGS. 10, 11 and 12 show three different embodiments wherein the clamping element 105 compressibly retains the block-flat arm portion combination within the clamping interior 121. In FIG. 10, the flanged portion 109 is rigidly secured to a flat portion of the holder 61 via fastening devices 107. The upper elastomeric block 87 has its flat upper surface contacting the under surface of the top or cap portion 117 of the clamp 105 and its lower flat surface contacting the upper planar surface 79 of the support-engaging end of the flat arm portion 77, while the lower planar surface 81 of the flat arm portion 77 engagably contacts the flat upper surface of the lower elastomeric block 89 whose lower flat surface engageably contacts the flat portion of the upper surface of the holder 61. The sandwiched combination comprising the elastomeric block 87, the support-engaging end of the flat arm portion 77 and the lower elastomeric block 89 is compressibly received within the clamping interior 121 so as to provide optimum shock absorbsion while providing a bias to urge the arm toward or away from the return run 41 without requiring any deterioration-facilitating apertures in either the blocks 87, 89 or in the flat arm portion 77. It will, therefore, be noted that the elastomeric blocks, designated by reference characters 87 and 89 of FIGS. 8-12, are similar to the correspondingly designated elastomeric blocks 87, 89 of FIGS. 2-4, the only differences being that the blocks of FIGS. 2-4 are provided with apertures while the blocks of FIGS. 8-12 are not. Additionally, the blocks of FIGS. 8-12 may be provided with a slotted portion 123 on one side thereof for clampably receiving the tab member 119 therein.

FIG. 11 is an alternate embodiment to the clamping arrangement of FIG. 10 except that a single elastomeric block 89 is disposed within the clamping interior 121 such that the upper planar surface 79 of the flat arm portion 77 engages the under surface of the top clamp portion of 117 while the lower planar surface 81 engages the upper flat surface of the elastomeric block 89. The lower flat surface of the elastomeric block 89 engages the flat portion of the holder 61 so that the combination of block 89 and the flat arm portion 77 are compressibly retained within the clamping interior 121 of the clamp 105.

FIG. 12 represents still another alternate embodiment of the clamping arragement of FIG. 10 wherein in a single block of the elastomeric material 87 is disposed within the clamping aperture 121 such that the upper flat surface of the block 87 engages the under side of the top clamping portion 117 while the lower flat surface of the block 87 engages the upper planar surface 79 of the flat arm portion 77 while its lower planar surface 81 engages the flat portion of the holder 61. The combination of the block 87 and the flat arm portion 77 is compressibly received within the clamping interior 121 to provide the necessary shock-absorbing and biasing characteristics previously described.

Figure 13:
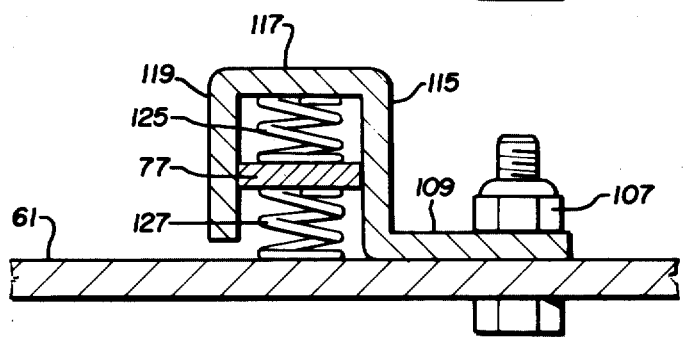
FIG. 13 is yet another alternate embodiment to the clamping arrangement of FIG. 10 wherein the support-engaging end of the elongated arm is clampably secured to the support between upper and lower compression spring members.

The embodiment of FIG. 13 illustrates yet another a clamping embodiment wherein the elastomeric blocks 87, 89 of FIG. 10 are replaced by a pair of corresponding compression springs 125, 127. The first compression spring 125 has one end contacting the under surface of the cap portion 117 of the clamp 105 and its lower end contacting the upper planar surface 79 of the flat arm portion 77 while the second compression spring has its upper portion engaging the lower planar surface 81 of the flat arm portion 77 and its lower spring surface contacting a surface of the holder 61 so as to compressible retain the flat arm portion 77 within the clamping interior 121 for both shock absorbsion and biasing purposes, as previously described.

FIG. 14 shows a perspective view of a block 129 of resilient or elastomeric material which is molded or adhered directly to the support-engaging end of the flat portion 77 of the arm 71 by adhesive means 131, or the like, as known in the art. The block 129 is a single integral unit which is molded to or adhered to the flat arm portion 77, as shown in FIG. 14. In this embodiment, the elastomeric blocks 87, and 89 have been replaced with a single molded unit and it would, of course, be obvious to fixedly adhere or mold either one of the blocks 87, 89 to the flat arm portion 77 to use the molded concept of FIG. 14 in the embodiments of FIGS. 10, 11 or 12.

Furthermore, FIG. 15 shows an embodiment wherein the elongated arm 71 is a rod-like member 133 having a generally circular cross-section. A block of elastomeric material 135 is illustrated by the phantom lines of FIG. 15 and show that the elastomeric block 135 may be molded or otherwise adhered adjacent the support-attaching end 137 of the rod 133. FIG. 16 illustrates still another embodiment for use with a clamping member 105 wherein the elongated arm 71 is a rod-like member 139 having a generally square or rectangular cross section. A block of elastomeric material 141 may be moled or otherwise adhered adjacent the support-attaching end 143 of the rod 139 for engagement by the clamp element 105 as previously described. The rod members 133 and 139 may be used with the clamping element 105 or with any suitably adapted clamping member. Similarly, the rods 133 and 139 need not necessarily be made of a spring like material but may be rigid metalic members with little or no spring-like characteristics.

In the prime embodiment of the present invention, as illustrated generally in FIG. 6, the clamping element 105 compressibly retains an elastomeric block and support-engaging arm end combination within an interior clamping cavity. The clamping element 105 is rigidly secured to the support assembly via the L-shaped holder 61 so that the arm is rockable with respect to the longitudinal axis of the support assembly 51 but is unable to slide laterally. The compressibly held combination of the elastomeric block and the end of the elongated 71 allows the elastomeric block to act as a shock-absorbing device while simultaneously biasing the arm to urge the scraper blade toward the return run 41 of the conveyor belt 37 when it has been moved away therefrom. The use of the clamping device 105 eliminates the need for apertures through either the support-engaging end of the elongated arms 71 or through the block of resilient material so that, in addition to all of the benefits achieved with respect to the earlier embodiments using the apertures elastomeric blocks to uniformly distribute the load experienced by the arm 71, the prime embodiment greatly prolongs the life of the elastomeric block and prevents premature deterioration of either the block or the arm which may result from the use of apertures therethrough.

With this detailed description of the specific apparatus used to illustrate the present invention and the operation thereof, it will be obvious to those skilled in the art that various modifications may be made in the present structure, in the construction and shape of the elastomeric blocks and/or the clamping element and in the various other elements illustrated in the embodiments described without departing from the spirit and scope of the present inventnion which is limited only by the appended claims.

I claim:

1. In a conveyor belt cleaner for a conveyor having a rotatable drum and an endless belt trained about said drum for defining delivery and return runs, a support fixedly positionable transversely of and adjacent to one of said runs, a plurality of scraper blades disposed transversely of said one run and a plurality of elongated arms equal in number of said scraper blades and disposed substantially lengthwise of said one run, each arm having one of said scraper blades secured to one end thereof and each arm having a support-engaging means at the opposite end thereof, each of said support-engaging means being individual to its arm and being positioned along the length of the support such that each of said arms is rockable relative to said support and to each of the others of said plurality of arms for moving said blades toward and away from said one run, the improvement characterized in that support-engaging means includes a block of resilient material attachable to the opposite end of said arm for absorbing the shock of said rocking motion and for biasing said arm to urge said scraper blade toward said one run after it has been moved away from the normal plane of said run, and clamping means attachable to said support for resiliently securing said block and the opposite end of said arm to said support for rockable movement with respect thereto without requiring apertures in said block and in the opposite end of said arm, said clamping means including a first substantially rectangular, relatively flat portion having apertures therein, the plane of said first portion defining a reference plane, fastening means engageable with said apertures and corresponding apertures in said support for fixedly attaching said first apertured portion to said support, an integral L-shaped clamping portion having a side portion integral with said first portion and generally perpendicular to said reference plane and a cap portion generally perpendicular to said side portion and extending from the top thereof in a direction opposite to the direction in which said first portion extends, said side portion and said cap portion being dimensionally similar to one another and a tab member integral with said cap portion and depending perpendicularly from the outer longitudinal dimension thereof, said tab member being substantially parallel to said side portion but dimensionally smaller than said side and cap portions, the interior surfaces of said side portion, said cap portions, and said tab member defining an interior clamping portion whose bottom is a portion of said support, said block and the opposite end of said arm being received within said interior clamping portion which resiliently mounts said block and arm for rockable movement with respect to said support, the combined size of said block and said opposite end of said arm being dimensionally greater than the size of said interior clamping portion to insure at least partial compressing of said block within said interior clamping portion, at least one of said faces engaging said opposite end of said arm, said block having a pair of side surfaces, with one side surface engaging the size portion of said L-shaped clamping portion, said second side surface having a notched portion, said tab member being received in said notched portion for retaining said block within said interior clamping portion.

2. The improved conveyor belt cleaner of claim further characterized in that said block is compressibly disposed within said interior clamping portion such that its upper face engages said opposite end of said arm and urges it against the underside of said cap portion and its lower faces engages said support.

3. The improved conveyor belt cleaner of claim 1 further characterized in that said block is compressibly disposed within said interior clamping portion such that its upper face engages the underside of said cap portion and its lower face engages said opposite end of said arm to secure said opposite end against said support.

4. The improved conveyor belt cleaner of claim 1 further characterized in that said support-engaging means includes a first and a second of said blocks compressibly disposed within the interior clamping portion such that the upper face of the first block engages the underside of said top portion, the lower face of said second block engages said support, and the lower face of said first block and the upper face of said second block resiliently engage said opposite end of said arm bias it in both directions.

5. The improved conveyor belt cleaner of claim 4 wherein said opposite end of said arm is generally rectangular in cross-section and has substantially planar upper and lower surfaces for engaging said lower and upper block faces respectively to uniformity distribute the load experienced by said arm over the maximum possible area of said blocks to prevent damage and prolong the effective life of the blocks and the arms.

* * * * *